United States Patent [19]

McMann, Jr. et al.

[11] 4,409,615

[45] Oct. 11, 1983

[54] VIDEO IMAGING WITH AUTOMATICALLY CONTROLLED RADIATION SOURCE

[75] Inventors: Renville H. McMann, Jr., New Canaan, Conn.; Stephen Kreinik, Monsey, N.Y.; Martin M. Novack, Weston, Conn.

[73] Assignee: Thomson-CSF Broadcast, Inc., Stamford, Conn.

[21] Appl. No.: 220,793

[22] Filed: Dec. 29, 1980

[51] Int. Cl.³ .............................................. H04N 5/32
[52] U.S. Cl. .................................... 358/111; 358/105; 378/99
[58] Field of Search ................. 250/416 TV; 358/111, 358/105, 135, 136, 110, 282, 93; 378/99, 100

[56] References Cited

U.S. PATENT DOCUMENTS

| | | | |
|---|---|---|---|
| 3,854,049 | 12/1974 | Mistretta et al. | 250/416 TV |
| 4,064,530 | 12/1977 | Kaiser et al. | 358/36 |
| 4,162,509 | 7/1979 | Robertson | 358/105 |

*Primary Examiner*—Joseph A. Orsino, Jr.
*Attorney, Agent, or Firm*—Martin Novack

[57] ABSTRACT

An adjustable source of radiation that is directable at a body to be imaged. Means are provided for converting radiation received from the body into an electronic video signal. A motion detector generates a motion-indicative signal as a function of differences between present and past video signal levels at elemental positions of the video frame. Control signal generating means are provided for generating a control signal as a function of said motion-indicative signal. The control signal is applied to the source of radiation to control the intensity thereof. In the preferred embodiment of the invention, the motion detection means comprises a portion of a video noise reduction system through which the video signal is processed before the display thereof. In this preferred embodiment the control signal generating means is operative to accumulate the motion-indicative signal over a substantial period of time, preferably at least one video frame, and to generate the control signal as a function of the motion-indicative signal. In this embodiment, the control signal can be used for automatic adjustment of the noise reduction system as well as for automatic adjustment of the intensity of the source of radiation.

27 Claims, 4 Drawing Figures

VIDEO IMAGING WITH AUTOMATICALLY CONTROLLED RADIATION SOURCE

BACKGROUND OF THE INVENTION

This invention relates to improvements in imaging a body and, more particularly, to an apparatus and method for obtaining improved body imaging including minimization of exposure of the body to the radiation used in performing the imaging.

In recent years significant advances have been made in techniques for imaging internal portions of a body using radiation such as x-rays. The radiation penetrates into the body and the properties of the internal portions of the body are determined from the radiation that is either transmitted through the body or reflected from the body, depending upon the type of radiation and system employed. Many such equipments involve the use of a means for converting the radiation obtained from the body (either transmitted through or reflected from the body) into an electronic video signal which is, in turn, displayed to obtain a television-type image of the body internal structure. For example, in an x-ray imaging system, the x-rays transmitted through the body may be detected and converted to an electronic video signal using a scintillation detector and a video generator, and the video signal can be displayed to provide a "real time" image of the body internal structure.

An important consideration, when using radiation to image the internal structure of a body, is to minimize the amount of radiation to which the body is exposed, especially when the body is a human patient. The dangers of substantial exposure to certain types of radiation are well known, and it is always desirable to minimize risks (regardless of the type of radiation used) by minimizing exposure of the body being examined. This objective is also compatible with saving energy. A counterveiling consideration, however, is the inadequate detected signal level that may result from using a radiation source of unduly low intensity. A lower signal level results in a lower signal-to-noise ratio, and the consequence can be a poorer quality of the ultimately presented image.

It is among the objects of the present invention to minimize the radiation to which a body must be exposed in order to obtain a resultant displayed image of at least a given effective quality. It is also among the objects of the present invention to improve the video display of images obtained using penetrating radiation.

SUMMARY OF THE INVENTION

In a form of the present invention, a device for imaging the internal structure of a body using radiation, such as an x-ray imaging apparatus, is employed in combination with a system for reducing noise in a video signal. The noise reducing system may be, for example, of the type disclosed in U.S. Pat. No. 4,064,530 wherein a digital representation of the present instantaneous video signal is combined with a digital representation of video signal stored during previous frames to obtain a combined digital video signal that is converted back to analog form and ultimately displayed. The relative "weighting" of the present and previous signals that are combined at each instant (i.e., for each video pixel) is determined by a "motion detection" control signal. The motion detector portion of the system is operative to compare the digital value (i.e., amplitude) of the present pixel with its counterpart in the stored video in order to determine the degree of "motion" at the particular position of the picture. If the new pixel value is close to the old pixel value, then little motion is attributed to this pixel of the image during the latest frame interval. In such case, the motion detector control signal operates to weight the above-referenced combination such that it includes a substantial fraction of the stored "old" picture information. For example, $\frac{3}{4}$ of the previous frame signal may be combined with the unity complement fraction (i.e., $\frac{1}{4}$), the present "new" video signal. If, however, the motion detection operation reveals a relative dissimilarity between the old and new pixel value, significant "motion" is indicated at the particular position of the image being processed. In such case a motion detection signal is generated and used to more heavily weight the fraction of "new" video information contributed to forming the combined signal. For example, the fractions used may be $\frac{3}{4}$ of "new" video signal to $\frac{1}{4}$ "old" video signal. Indeed, if a certain prescribed degree of "motion" is detected (the threshold being operator adjustable), then the motion detector generates a "bypass" control signal which causes the combining means to use only the "new" video information and no "old" video information. The overall noise reducer system thereby operates to eliminate noise most effectively from those portions of the image in which there is little or no motion. However, when motion is present in part of an image, the averaging in of old information would cause the appearance of "smearing" of the ultimately displayed video, so the noise reduction is automatically reduced or eliminated in those portions of the video field in which significant motion is detected. The manner in which motion detection is used in the present invention will be described shortly hereinbelow.

In accordance with the apparatus of the invention, there is provided an adjustable source of radiation that is directable at the body to be imaged. Means are provided for converting radiation received from the body into an electronic video signal. A motion detection means is responsive to the video signal for generating a motion-indicative signal as a function of differences between present and past video signal levels at elemental positions of the video frame. Control signal generating means are provided for generating a control signal as a function of said motion-indicative signal. The control signal is applied to the source of radiation to control the intensity thereof. Means are also provided for displaying the video signal.

In the preferred embodiment of the invention, the motion detection means comprises a portion of a video noise reduction system through which the video signal is processed before the display thereof. In this preferred embodiment the control signal generating means is operative to accumulate the motion-indicative signal over a substantial period of time, preferably at least one video frame, and to generate the control signal as a function of the motion-indicative signal. In this embodiment, the control signal can be used for automatic adjustment of the noise reduction system, as well as for automatic adjustment of the intensity of the source of radiation. As will become understood, the control signal is a function of the gross motion of the body being imaged.

To initially understand operation of the invention, consider the following simplified examples. Assume that the body being imaged is stationary within the video field of view and that no parts of the body are moving substantially in the field of view. In such case, it will be desirable to maximize the amount of noise reduction of the video signal. (As will be described further, the noise reduction system is adjustable, to a selected level of noise reduction, by modifying the criteria which determine the relative fractions of present and past video to be combined at each pixel when a particular degree of motion is detected at the particular pixel.) With the noise reduction system operating at its maximum level of noise reduction, the signal intensity of the source can be adjusted to the lowest level which provides a video output signal of adequate quality. The motion of a small part of the body in the field of view may not significantly alter this situation. Although noise reduction may be reduced in those parts of the image where there is motion, the signal-to-noise ratio in most of the field of view will be adequate as long as there is little "gross motion" of the body in the field of view.

Assume next that there is gross motion of the body in the field of view, such as may occur if the x-ray detector is moved with respect to the body, or vice versa. In such case, if the noise reduction level is set high, there may be significant smearing of the ultimately presented image. To prevent such smearing, the noise reduction function can be reduced or eliminated. Also, the intensity of the radiation source can be automatically increased to compensate for the loss in the effective signal-to-noise ratio of the ultimately displayed image caused by the lessening of the noise reduction function.

In the present invention, the radiation intensity is automatically adjusted in accordance with gross motion of the body with respect to the detector. When there is little or no motion detected over a given period (preferably, one or more video frames,) the noise reduction function is adjusted to a maximum and the source radiation intensity is minimized. When substantial motion is detected over the given period, the source of radiation is maximized and the noise reduction function is adjusted to a minimum.

DESCRIPTION OF THE PREFERRED EMBODIMENT

Figure 1:
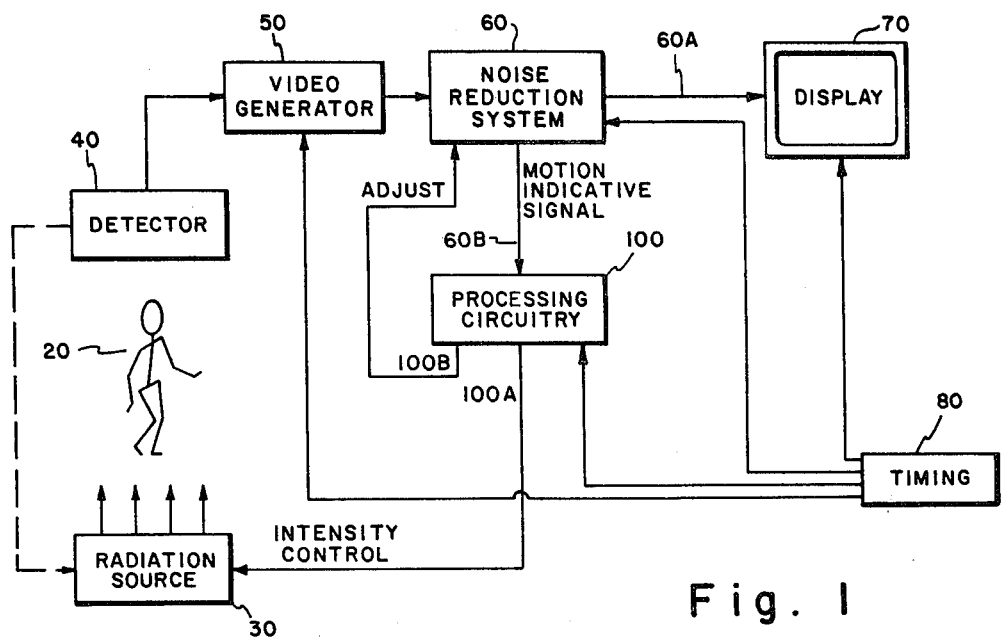
FIG. 1 is a block diagram of an apparatus in accordance with the invention and which can be used to practice the method of the invention.

Referring to FIG. 1, there is shown a block diagram of an apparatus 10 for obtaining a displayed image of the internal structure of a body 20. The apparatus 10 conventionally includes a radiation source 30, a detector 40 and a video signal generator 50. The combination of detector and video generator may include, for example, an x-ray image intensifier in conjunction with a television camera. The video signal from generator 50 is coupled to a noise reduction system 60, which may be a digital noise reducer of the type set forth in U.S. Pat. No. 4,064,530, incorporated herein by reference. The video output 60A of the noise reduction system 60 is coupled to a video display unit 70. The noise reduction system 60 also has a motion-indicative output signal, and this signal is coupled to processing circuitry 100.

An output of processing circuitry 100 is coupled to the intensity control of radiation source 30. A further output of processing circuitry 100 is coupled back to noise reduction system 60 and, as will be described hereinbelow, can be used for adjustment of the noise reduction system. Timing module 80, which includes the basic system clock and also derives the video synchronizing signals in conventional fashion, is shown as being coupled to video generator 50, noise reduction system 60, display 70, and processing circuitry 100.

Figure 2:
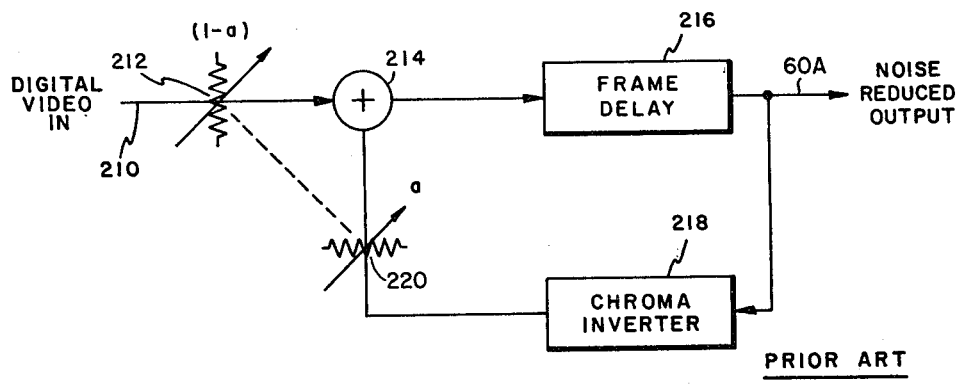
FIG. 2 is a generalized block diagram of a prior art digital video noise reduction apparatus.
Figure 3:
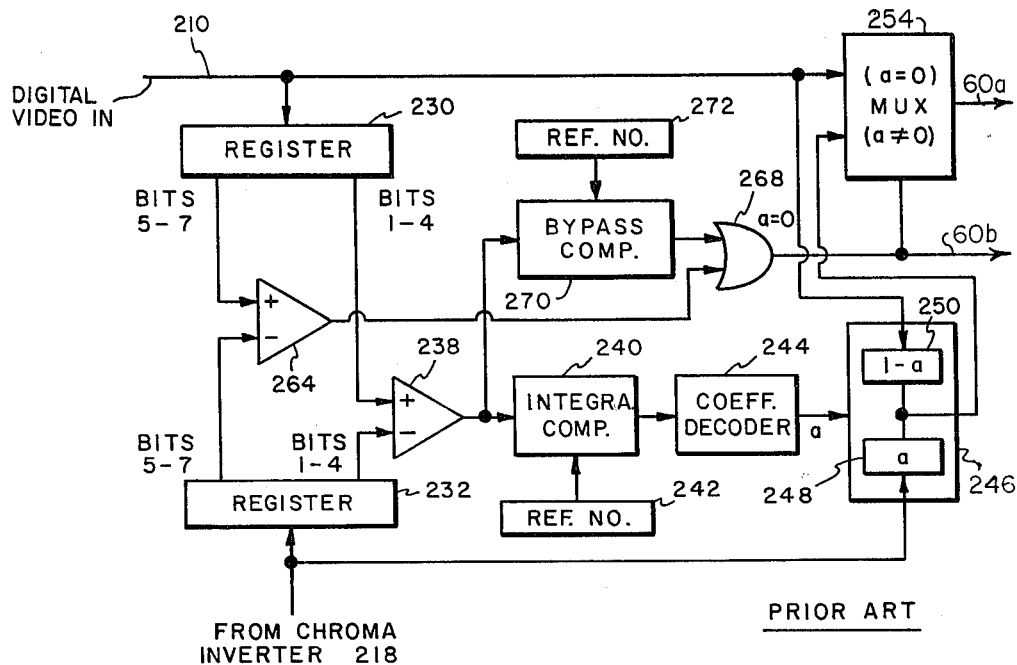
FIG. 3 is a block diagram of a portion of a prior art digital video noise reduction apparatus, including the motion detector portion thereof.

To facilitate understanding of the invention, a simplified description of the digital noise reducer 60 is set forth in conjunction with FIGS. 2 and 3. FIG. 2 illustrates, in general terms, the operation of the type of digital noise reducer that is disclosed in U.S. Pat. No. 4,064,530. A video input signal on an input line 210, which has typically been digitized (by means not shown), is applied via a variable attenuator 212 to one input terminal of a summing circuit 214. The output signal from the summing circuit 214 is applied to a delay circuit 216 which has an inherent delay of one frame period. The output of delay 216 is applied through a chroma inverter 218 and a variable attenuator 220 to a second input terminal of summing circuit 214. Attenuators 212 and 214 operate in concert, as represented by the dashed line between them, to introduce transmission coefficients of "(1−a)" and "a", respectively. In other words, a fractional portion (1−a) of the amplitude of the incoming or "present" video signal is applied to one input of the summing circuit 214 and a fractional portion "a" of the amplitude of the "past" stored video signal from delay device 216 is applied to the other summing circuit input. As is evident, if the value of coefficient "a" is, for example, increased, the proportion of the stored signal applied to the summing circuit increases, and the proportion of the present video signal applied to the summing circuit decreases. Conversely, if "a" is, for example, decreased, a larger proportion of the present signal and a smaller proportion of the stored signal are applied to the summer. The configuration shown in FIG. 2 is referred to as an "infinite memory" in which a fractional amplitude portion of the sum of previous or earlier frames are added to a fractional amplitude portion of the incoming or present video signal, the relative importance of a signal n frames back being determined by the value of "a". The basic operating principle of the digital noise reducer is as follows: If there is no motion between successive frames, the video signals representing the successive frames will be signals identical in information content, and only the amount of noise in each will differ. When a multiplicity of such identical signals are summed, as just described, the result is a signal identical to any one of the summed signals and of the same magnitude as the attenuated incoming signal, by virtue of the fact that the sum of "a" and (1−a) is always unity. However, random noise which is present will tend to cancel. The improvement in the signal-to-noise power ratio achievable with this type of recursive filter system is $$(1+a)/(1-a).$$

The noise reduced video output can be taken at the output of delay circuitry 216, as shown, or at the output of summing circuit 214 or chroma inverter 218. Description of the function of chroma inverter 218 is not necessary for an understanding of the present invention, and reference can be made, if desired, to the above-referenced U.S. Pat. No. 4,064,530 for additional description. For monochrome use, the chroma inverter will, of course, not be necessary.

The coefficient "a" (and consequently (1−a) are determined, in the digital noise reducer, by detecting motion between previously stored information and the present video signal, this being done for each element or pixel of the picture represented by the video signal. FIG. 3 is a block diagram of the circuitry which performs the function of summer 214 and attenuators 212 and 220 of FIG. 2, while also detecting the amount of motion at each pixel in order to control the attenuation coefficients. In FIG. 3 the "present" video signal received on line 210 is an eight-bit digitally encoded signal (encoded by means not shown) which is applied to an eight-bit register 330. Stored video, received via chroma inverter 218 (FIG. 2), is applied to another eight-bit register 232. In order to detect "motion" at the pixel being processed, the stored video is compared with the present video. In a first aspect of the comparison, four of the less significant bits of the stored video and four of the less significant bits of the present video are respectively applied to the negative and positive input terminals of a difference amplifier 238. If the eight bits representative of the video level of the pixel under consideration are designated bit 0 (least significant) through bit 7 (most significant), the four bits referred to can be bits 1-4. The output of difference amplifier 238 is applied to an integration comparator 240 which compares the difference amplifier output to an integration reference number (indicated at 242). The output of integration comparator 240 is applied to a coefficient decoder 244 that is operative to generate the coefficient "a" which, as noted above, determines the fractional amplitude proportion of the stored video signal that is to be added to the present video signal. The coefficient decoder 244 is operative, depending on the particular difference number produced by the integration comparator 240, to produce one of three values of "a"; viz., the fractions $\frac{1}{4}$, $\frac{1}{2}$ or $\frac{3}{4}$. In the case of a relatively large difference at the output of integration comparator 240, indicative of the greatest tolerable motion (i.e., the greatest motion at which noise reduction is still implemented), the coefficient "a" has a value of $\frac{1}{4}$. When the difference at the output of comparator 240 is smaller, indicating less motion between the stored and present video, the decoder produces a coefficient "a" having a value of $\frac{1}{2}$. When still less motion is detected as being present, a coefficient having a value of $\frac{3}{4}$ is produced. The coefficient "a", in the form of a digital word, is applied to the summing device 246, which includes elements 248 and 250, respectively, labelled "a" and "(1−a)", to signify the relative fractional amplitude portions of the stored video and present video, respectively, that are summed. The stored video is applied to the element 248, and the present video is applied to the element 250. The sum of the respective fractional amplitude portions is applied over line 252 as one input to a multiplexer 254 which is operative to transmit a noise-reduced video signal to the line 60a in situations when the value of coefficient "a" is not zero.

To handle cases where a large difference exists between the stored and present signal, as indicated in the more significant bits, a second comparison is made, this one being between the three most significant bits of the stored video and the three most significant bits of the present video. In particular, the three most significant bits of the stored video and the present video are respectively applied to the negative and positive input terminals of another difference amplifier 264. When the difference amplifier 264 detects a difference between the three most significant bits of the stored video and the three most significant bits of the present video (indicating that there is significant "motion" at the pixel under consideration, the motion being in excess of the allowable threshold), a signal is applied to one input of OR circuit 268 which, in turn, applies a signal to multiplexer 254 that effectively causes the coefficient "a" to go to zero. This means that if the detected motion exceeds a predetermined threshold, none of the stored video is added to the present signal and, instead, the present signal only is transmitted to the output line 60a. This condition is known as a "bypass" since the noise reduction function is effectively bypassed in this condition and only the present video signal is coupled to the output of the noise reducer.

A further circuit is also provided for making the value of coefficient "a" go to zero. In particular, the output of difference amplifier 238 is also applied to a so-called bypass comparator 270 in which it is compared to a bypass threshold number (indicated at 272), which typically has a value greater than the value of the integration reference number. When the difference in the output of difference amplifier 238 exceeds the bypass threshold number, bypass comparator 270 produces an output signal which is applied to a second input of OR circuit 268, which produces an output that is, in turn, applied to multiplexer 254 to cause the coefficient "a" to go to zero. Thus, it is seen from the above that the coefficient "a" will go to zero, causing only the present video signal to be coupled to the output line 60a when (1) there is difference between the three most significant bits of the stored and present video signal, or (2) the difference between four less significant bits of the stored and present video signals exceeds a preselected bypass threshold number. In the absence of these bypass conditions, the coefficient "a" is determined as previously described.

Figure 4:
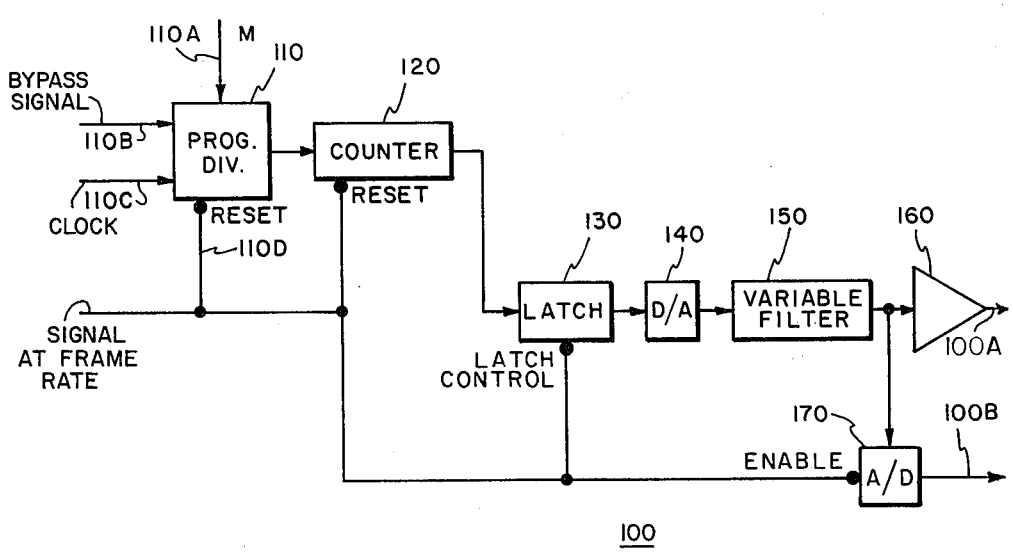
FIG. 4 is a block diagram of a portion of the processing circuitry portion of FIG. 1.

Referring to FIG. 4, there is shown a block diagram of an embodiment of the processing circuitry 100 of FIG. 1. The processing circuitry includes a programmable divider 110 which may be, for example, a model SN7497 or SN74167 manufactured by Texas Instruments Corp. The divisor of the division operation is adjustable by operator-controllable switches via lines 110A. The operator thereby selects an input number M which is used as the denominator of the division operation which, as will be seen, acts as an adjustment of sensitivity in the present embodiment. The programmable divider 110 receives as an input from line 60B the "bypass" signal from the digital noise reducer 60 (in FIG. 3). As described above, the bypass signal is "on" when more than a certain minimum motion is detected at a particular pixel of the video frame. If the motion detected at the present pixel is below a prescribed threshold setting of the digital noise reducer 60, the bypass signal will be "off". The programmable divider 110 also receives, on a clocking line 110C, the basic clock signal, and, on a reset line 110D, a signal at the frame rate. These signals are available from the timing circuitry 80 (FIG. 1). The basic clock comprises clock pulses which occur at the individual element or pixel rate of the video frame. The programmable divider 110 is operative to generate an output each time the bypass signal is "on" during at least M clock pulses, where M is selected by the operator.

The output of programmable divider circuit 110 is coupled to a digital counter 120. The counter also receives, on its reset line, the signal at the frame rate from timing circuit 80. At the end of a video frame, the counter 120 will contain a count that is substantially equal to the number of video elements or pixels during which at least the prescribed degree of motion was found to be present (designated E), divided by the operator-selected adjustment, M; i.e., a count E/M. When the reset signal occurs, at said end of the frame, the counter contents are output to latch 130 which is also synchronized at the frame rate. The output of latch 130 is coupled to a digital-to-analog converter 140 whose output is, in turn, coupled to a filter circuit 150 having an adjustable time constant. The output of filter 150 is coupled via buffer amplifier 160 to the line 100a which is, in turn, coupled to the intensity adjustment control of radiation source 30 (FIG. 1). The output of variable filter 150 is also coupled to an analog-to-digital converter that is enabled by the signal at the frame rate. The output of analog-to-digital converter 170, on (multibit) line 100b, is coupled to the digital noise reducer 60 and can be used, for example, as the bypass threshold number 272 or the integration reference number 242 (FIG. 3).

In operation, the total amount of motion in a frame of video information (or a succession of frames, as determined, for example, by the time constant of filter circuit 150) is used to control the intensity of the x-ray source and, if desired, the feedback characteristic of the digital noise reducer. In particular, when the bypass signal is on during a substantial portion of a frame, the output of counter 120 will be relatively high at the end of the frame. A number of such frames (depending on the time constant of filter 150) will result in a relatively high output on line 100a. This indication of substantial gross motion of the body being imaged means that the noise reduction function will be minimal for a significant portions of the body image (as follows from the description above of noise reduction system 60). Accordingly, to maintain the highest available signal-to-noise ratio in the image, a large signal on line 100a causes no attenuation of the x-ray source. Conversely, a relatively small signal on line 100a is indicative of relatively little gross motion of the various portions of the body being imaged. Since this will result in significant noise reduction by the noise reduction system for most of the body being imaged (as explained above), the small signal on line 100a causes an attenuation of the radiation source, since less source intensity is needed to obtain the required signal-to-noise ratio. Thus, it is seen that the signal on line 100a is applied in inverse relation to the attenuation control of radiation source 30.

Regarding the output 100b, an accumulation of frames having substantial motion is used to effectively reduce the feedback coefficient of the noise reduction system in the presence of relatively high overall or gross motion of the body in the field being imaged. The reverse is also true in that relatively little gross motion of the body being imaged means that the feedback coefficient of the noise reduction system is increased.

The time constant of the variable filter 150 determines the number of frames (one or more) which contribute to the determination of the signals 100a and 100b. It will be understood that, if desired, different time constants could be employed, such as by providing separate variable filters at the output of digital-to-analog converter 140. Also, if desired, the output of analog-to-digital converter 170 could be coupled to line 100b via a read-only memory (not shown) that is used to provide a program selected control of the noise reducer feedback function.

We claim:

1. Apparatus for imaging a body, comprising:
   an adjustable source of radiation directable at the body;
   means for detecting radiation received from said body;
   means for converting the detected radiation into an electronic video signal;
   motion detection means responsive to said video signal for generating a motion-indicative signal as a function of differences between present and past signal levels at elemental positions of the video frame;
   control signal generating means responsive to said motion-indicative signal for generating an intensity control signal as a function of said motion-indicative signal;
   means for applying said control signal to said source of radiation to vary the active intensity of said source of radiation; and
   means for displaying said video signal.

2. Apparatus as defined by claim 1 wherein said control signal generating means is operative to accumulate the motion-indicative signal and to generate said control signal as a function of the accumulated motion-indicative signal.

3. Apparatus as defined by claim 2 wherein said control signal is generated as a function of the motion-indicative signal accumulated over a period of at least one video frame.

4. Apparatus as defined by claim 2 wherein said control signal is operative to attenuate the intensity of said radiation source in an inverse relationship to the accumulated motion-indicative control signal.

5. Apparatus as defined by claim 3 wherein said control signal is operative to attenuate the intensity of said radiation source in an inverse relationship to the accumulated motion-indicative control signal.

6. Apparatus as defined by claim 1 wherein said radiation comprises x-rays.

7. Apparatus as defined by claim 2 wherein said radiation comprises x-rays.

8. Apparatus as defined by claim 5 wherein said radiation comprises x-rays.

9. Apparatus for imaging a body, comprising: an adjustable source of radiation directable at the body;
   means for detecting radiation received from said body;
   means for converting the detected radiation into an electronic video signal;
   a video noise reduction system including means for storing past video signals, motion detection means responsive to present video signals and past video signals for generating a motion-indicative signal as a function of differences between present and past video signal levels at elemental positions of the video frame, and means for combining fractional portions of the present video signals and the past video signals, the fractional portions being dependent upon said motion-indicative signal;
   control signal generating means responsive to said motion-indicative signal for generating a control signal as a function of said motion-indicative signal;

means for applying said control signal to said source of radiation to vary the active intensity of said source of radiation; and means for displaying the output of said video noise reduction system.

10. Apparatus as defined by claim 9 wherein said control signal generating means is operative to accumulate the motion-indicative signal and to generate said control signal as a function of the accumulated motion-indicative signal.

11. Apparatus as defined by claim 10 wherein said control signal is generated as a function of the motion-indicative signal accumulated over a period of at least one video frame.

12. Apparatus as defined by claim 10 wherein said control signal is operative to attenuate the intensity of said radiation source in an inverse relationship to the accumulated motion-indicative control signal.

13. Apparatus as defined by claim 11 wherein said control signal is operative to attenuate the intensity of said radiation source in an inverse relationship to the accumulated motion-indicative control signal.

14. Apparatus as defined by claim 9 further comprising means for coupling said control signal to said video noise reduction system.

15. Apparatus as defined by claim 11 further comprising means for coupling said control signal to said video noise reduction system.

16. Apparatus as defined by claim 9 wherein said motion detection means is adjustable as to the degree to which it is responsive to present and past video signal levels, and further comprising means for coupling said control signal to said adjustable motion detection means.

17. Apparatus as defined by claim 10 wherein said motion detection means is adjustable as to the degree to which it is responsive to present and past video signal levels, and further comprising means for coupling said control signal to said adjustable motion detection means.

18. Apparatus as defined by claim 13 wherein said motion detection means is adjustable as to the degree to which it is responsive to present and past video signal levels, and further comprising means for coupling said control signal to said adjustable motion detection means.

19. Apparatus as defined by claim 9 wherein said radiation comprises x-rays.

20. Apparatus as defined by claim 10 wherein said radiation comprises x-rays.

21. Apparatus as defined by claim 13 wherein said radiation comprises x-rays.

22. Apparatus as defined by claim 18 wherein said radiation comprises x-rays.

23. A method for imaging a body, comprising the steps of:

directing an adjustable source of radiation at the body;

detecting radiation received from said body;

converting the detected radiation into an electronic video signal;

generating a motion-indicative signal as a function of differences between present and past video signal levels at elemental positions of a video frame of said video signal;

generating an intensity control signal as a function of the motion-indicative signal;

applying said control signal to said source of radiation to vary the active intensity of said source of radiation; and displaying said video signal.

24. The method as defined by claim 23 wherein said control signal is generated as a function of accumulations of the motion-indicative signal.

25. The method as defined by claim 24 wherein said control signal is generated as a function of the motion-indicative signal accumulated over a period of at least one video frame.

26. The method as defined by claim 24 wherein said control signal is operative to attenuate the intensity of said radiation source in an inverse relationship to the accumulated motion-indicative control signal.

27. The method as defined by claim 23 wherein said radiation comprises x-rays.

* * * * *